(12) United States Patent
Inoue et al.

(10) Patent No.: US 9,896,082 B2
(45) Date of Patent: Feb. 20, 2018

(54) VEHICLE DRIVING SUPPORT CONTROL DEVICE

(71) Applicant: TOYOTA JIDOSHA KABUSHIKI KAISHA, Toyota-shi, Aichi-ken (JP)

(72) Inventors: Shintaro Inoue, Kanagawa-ken (JP); Hideo Inoue, Kanagawa-ken (JP); Yutaka Hirano, Susono (JP); Pongsathorn Raksincharoensak, Fuchu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 61 days.

(21) Appl. No.: 15/045,400

(22) Filed: Feb. 17, 2016

(65) Prior Publication Data

US 2016/0236679 A1  Aug. 18, 2016

(30) Foreign Application Priority Data

Feb. 18, 2015 (JP) ................................ 2015-029471

(51) Int. Cl.
*B60W 10/184* (2012.01)
*B60W 10/20* (2006.01)
*B60W 30/045* (2012.01)

(52) U.S. Cl.
CPC .......... *B60W 10/184* (2013.01); *B60W 10/20* (2013.01); *B60W 30/045* (2013.01);
(Continued)

(58) Field of Classification Search
CPC .. B60W 30/025; B60W 10/184; B60W 10/20; B60W 2510/20; B60W 2710/18; B60W 2710/202
See application file for complete search history.

(56) References Cited

U.S. PATENT DOCUMENTS 6,239,568 B1 * 5/2001 Sugitani .................. B62D 6/00
                                                          180/410
6,295,496 B1 * 9/2001 Shinmura ............ B62D 5/0472
                                                          180/446
(Continued)

FOREIGN PATENT DOCUMENTS

JP         4173292 B2    10/2008
JP     2010030398 A      2/2010
(Continued)

*Primary Examiner* — Behrang Badii
*Assistant Examiner* — Daniel L Greene
(74) *Attorney, Agent, or Firm* — Sughrue Mion, PLLC (57) ABSTRACT

There is provided a structure in a driving support system of a vehicle equipped with a steering assist mechanism and a torque vectoring mechanism of right and left wheels, the system capable of reducing an occurrence of a driver's sense of incongruity as much as possible also during the operation of a control based on a machine input and reflecting a driver's steering in the control. The inventive device comprises a steering assist torque controller which controls a steering assist torque given by the steering assist mechanism, a right and left braking-driving force difference controller which controls the braking-driving force difference between the right and left wheels given by the torque vectoring mechanism and a control target value determiner which determines the target values of the steering assist torque and braking-driving force difference for driving support control, based on the steering torque by the driver.

6 Claims, 4 Drawing Sheets

(52) U.S. Cl.
   CPC . *B60W 2710/202* (2013.01); *B60W 2720/406* (2013.01); *B60Y 2300/82* (2013.01)

(56) References Cited

U.S. PATENT DOCUMENTS

| | | | | |
|---|---|---|---|---|
| 6,360,153 | B1* | 3/2002 | Shinmura | B60K 17/16 180/233 |
| 6,597,975 | B1* | 7/2003 | Shinmura | B62D 5/0472 318/430 |
| 2002/0030407 | A1* | 3/2002 | Nishizaki | B60T 8/1755 303/146 |
| 2004/0099469 | A1* | 5/2004 | Koibuchi | B60T 8/175 180/421 |
| 2005/0187713 | A1* | 8/2005 | Yamamura | G08G 1/167 701/301 |

FOREIGN PATENT DOCUMENTS

| | | |
|---|---|---|
| JP | 2010058691 A | 3/2010 |
| JP | 2011073530 A | 4/2011 |

\* cited by examiner

VEHICLE DRIVING SUPPORT CONTROL DEVICE

TECHNICAL FIELD

The present invention relates to a device for supporting the driving of a vehicle, such as an automobile, and more specifically to a device which performs a driving support in a vehicle equipped with a steering assist mechanism and a torque vectoring mechanism while coordinating operational controls of those mechanisms and a driver's operation in the support control.

BACKGROUND ART

In the field of the driving control of a vehicle, such as an automobile, there have been proposed various types of driving support systems and/or automatic driving systems to control a steering mechanism and/or an accelerating-decelerating mechanism of a vehicle so that a driver can drive the vehicle more easily. For instance, in the Lane Keeping Assist (LKA) control, in order to prevent a running vehicle from deviating from its lane, a caution is given to a driver with a warning buzzer, etc., when the vehicle is likely to deviate from a lane. Further, in a radar cruise control, a steering support for a driver is performed to execute a speed control which maintains a vehicle speed to a set speed without depressing an accelerator pedal while making the vehicle running along a lane. Also, in the Intelligent Parking Assistant (IPA), a steering support is performed in parallel parking or vehicle garaging. Moreover, in patent document 1, there is disclosed a structure in which, in conducting a lane change of a running vehicle, the steering reaction force of a handle is changed so as to bring the actual steering angle close to an optimal steering angle computed based on circumference environment information, thereby making it easy for a driver to adjust the steering angle to the optimal steering angle.

PRIOR TECHNICAL DOCUMENTS

Patent Documents

Patent document 1: Japanese Patent No. 4173292

SUMMARY OF INVENTION

Technical Problem

In a vehicle installed with a driving support system and/or an automatic driving system as described above, generally, when a driver performs an overriding operation at a high degree against an operational control by a system, i.e. a machine, the machine will stop its operational control. For example, when a driver performs a steering input, an accelerator or brake pedal input, etc. for right and left turning, lane changing or an urgent avoidance during an operation of a cruise control, the system will suspend its operation. Also in IPA, its operation is interrupted by an override through a driver's handle steering. Namely, in the operating state of a vehicle in which a driving support control or an automatic driving control as mentioned above is performed, usually, either of an operation only based on the input by a system (a machine input—a target input set by the machine based on circumference environment information, etc.) and an operation only based on a driver input (a driver's driving input or a target input set based on it) is selected (In the case of the structure disclosed in patent document 1, although the operational control by a machine is not interrupted even if a driver performs a steering operation, this control is a control making a driver's steering follow a demand of the machine, and thus, it can be said that that control is an operational control by the machine in which a driver's steering is substantially not reflected.).

In this regard, it is expected that the control based on a machine input will realize more efficient driving of a vehicle as compared with the control based on a driver input. Moreover, although the light weighting of a vehicle is hoped from the point of view of environmental problems and requests for low fuel consumption and low electric power consumption, there are concerns that the stability of a vehicle against side winds or road surface disturbances could deteriorate in the case of a lightweight vehicle because of its small moment of inertia in the yaw direction, deteriorations of aerodynamic performances, etc., and therefore, the usefulness of a driving support control based on a machine input becomes higher. However, if it is supposed that the operating state only based on a machine input be always maintained in a vehicle operated by the system for driving support control as described above (In that case, the vehicle would be driven in a perfect automatic driving condition.), it would become difficult for a driver to sensuously grasp the condition of the running vehicle. In order to solve it, for example, there can be considered a structure which gives a driver an apparent steering reaction force and an apparent pedal reaction force based upon vehicle motions using a steer-by-wire system. However, it is also difficult for the driver to intuitively perceive the condition of the vehicle which he is driving because of the acquisition delay of ambient environment information and/or control operation delay. Moreover, when the contribution from the control by a machine input for the driving support in the driving of a vehicle is increased in order to realize it (when its control input gain is increased), the driver becomes likely to feel incongruity against its control. This is because a driver can recognize the steering angle information and reaction torque information directly and highly sensitively through the hand grabbing a handle. For example, in realizing a large control input only with a steering mechanism in order to make a running track of a vehicle follow a target track set by the machine in entering into a curve, a large steering angle input and a large steering reaction force are generated so that the driver, grabbing the handle, will feel, through the sense of hands, the difference of the large steering angle input and large steering reaction force, corresponding to the control input by the machine, from the steering angle and/or torque that the driver wants to input by himself.

In the point of view of the comfortableness in the driving, it is preferable to avoid the occurrence of the sense of incongruity of a driver due to executing a control based on a machine input in a driving support system or an automatic driving system as described above. Also, even though a vehicle can be driven efficiently by a control based on a machine input, if the driving operations of a driver, namely, the driver's intentions for the driving are not reflected in the driving condition of the vehicle, the driver would feel the sense of incongruity against the driving more strongly. However, in the case of a structure as in the conventional systems in which the driving condition of a vehicle is determined alternatively by the operation only based on a machine input or by the operation only based on a driver input, the advantageous effect of the control based on the machine input could not be obtained when the operation only based on the driver input is chosen for reducing a driver's sense of incongruity or achieving a driver's intention.

Thus, one object of the present invention is to provide a structure which can reduce occurrences of driver's sense of incongruity as much as possible even during an operation of a control based on a machine input in a driving support system or an automatic driving system of a vehicle.

Further, another object of the present invention is to provide a structure in which a driver's intention for the driving can be reflected even during an operation of a control based on a machine input in a driving support system or an automatic driving system of a vehicle as described above.

Solution to Problem

According to the present invention, the above-mentioned object is achieved by a driving support control device of a vehicle equipped with a steering assist mechanism and a torque vectoring mechanism of right and left wheels, comprising: a steering assist torque controller which controls a steering assist torque for the driving support control, given by the steering assist mechanism; a right and left braking-driving force difference controller which controls a braking-driving force difference between the right and left wheels for the driving support control, given by the torque vectoring mechanism; and, a control target value determiner which determines, based on a steering torque by a driver, a target value of the steering assist torque and a target value of the braking-driving force difference for the driving support control.

In this structure, the "steering assist mechanism" may be a device which assists a driver to steer a vehicle by adding a steering torque in steering with a handle, etc. by the driver, for example, a power steering device, etc., as well known in this field. The "steering assist torque" is a torque given by the steering assist mechanism. Further, the "torque vectoring mechanism of right and left wheels" may be a mechanism which can arbitrarily adjust the magnitudes and/or ratios of braking-driving forces in the respective right and left wheels of a vehicle, and for this mechanism, there may be employed a mechanism with a right and left driving force distributing differential gear of various types, which distributes a driving force transmitted from one prime mover (an engine or a motor) through a propeller shaft to right and left wheels at arbitrary ratios; a mechanism which controls braking-driving force distribution by adjusting braking forces of right and left wheels arbitrarily; or a mechanism in which in-wheel motors independently control right and left braking-driving forces of the respective wheels. The "driving support control" is a control which controls the steering angle or the turn direction of a vehicle (a steering torque, a yaw rate, a yaw moment, etc.), to assist the running of the vehicle along a course or direction, judged or determined to be suitable based on circumferential environment information of a vehicle. This control may be, for example, a driving support system as already described, such as LKA, IPA or a system which conducts operational controls of a steering mechanism or an acceleration and deceleration mechanism of a vehicle such that the vehicle will be preferably driven along a running route set suitably for a destination that a driver wishes (a future course).

In the inventive device performing the driving support control, one of its features is to employ not only the "steering assist mechanism" but also the "torque vectoring mechanism of right and left wheels" as the "actuators" providing a steering torque or a yaw moment to a vehicle in order to attain the driving support control. According to this structure, a control amount given to a vehicle in the driving support control can be shared also by the torque vectoring mechanism, and thus, the control amount to the steering assist mechanism will be reduced in comparison with when the driving support control is conducted only by the steering assist mechanism. Then, for a driver who sensuously grasps the condition of the steering mechanism by grabbing a handle by hands, the operation amount of the steering assist mechanism owing to the driving support control, which differs from that owing to his/her own handle operation, is reduced, and therefore, the reduction of the sense of incongruity which the driver feels is also expected. Moreover, in the above-mentioned inventive device, since the control target value determiner determines the target value of the steering assist torque and the target value of the braking-driving force difference for the driving support control while taking into account the steering torque given by the driver, it becomes possible to reflect the driver's steering in the target value of the steering assist torque and the target value of the braking-driving force difference so that a further reduction of the sense of incongruity that the driver feels will be achieved.

In the above-mentioned inventive device, there may be provided a means for setting or determining a target of a vehicle motion, i.e., the target value of the vehicle motion by the control based on a machine input for the "driving support control", independently of a driver's driving operation (steering, acceleration and deceleration operation), namely, without depending upon a driver's driving operation. Thus, the inventive device may comprise a motion target value determiner which determines a motion target value, which is a target value of a motion index value representing a motion of the vehicle in the driving support control without depending on a driver's driving operation, and the above-mentioned control target value determiner may be configured to determine the target value of the steering assist torque and the target value of braking-driving force difference between right and left wheels based on the motion target value and the steering torque by the driver. In a case of performing the driving support by controlling a turning condition of a vehicle, the motion index value representing a vehicle motion may be a value indicating a running motion of the vehicle, such as a lateral displacement, a lateral velocity, a yaw rate, a lateral acceleration, etc. of the vehicle (However, it should be understood that the motion index value is not limited to these, and it may be the other arbitrary index value indicating a vehicle motion, such as a longitudinal displacement, a vehicle speed, a slip angle, etc.), and the motion target value is a target value of the motion index value as described above, which is a target value determined based on a machine input, namely, a value determined by an arbitrary system or device using circumferential environment information of the vehicle, for example, information acquired from a camera, a radar sensor, a GPS device, etc., or information on a future course as described above. And, since a target value of a steering assist torque and a target value of a right and left wheels braking-driving force difference between right and left wheels for the driving support control will be determined based on a motion target value determined based on a machine input and a steering torque by the driver, it becomes possible to realize the more advanced coordination between the vehicle motion determined preferably by a machine input and the driver's steering.

In a case of determining the target value of the steering assist torque and the target value of the braking-driving force difference between the right and left wheels based on the motion target value and the steering torque by the driver, more in detail, the target value of the steering assist torque and the target value of the braking-driving force difference between the right and left wheels may be determined based on an "input torque value", which is a torque obtained by deducting the steering torque by the driver from the steering torque corresponding to the motion target value. According to this structure, in a vehicle, a motion target value determined based on a machine input can be realized by a torque by a machine (the total of a steering assist torque and a torque by a braking-driving force difference) and a steering torque by a driver. That is, since a steering by a driver will also be reflected in the motion of a vehicle realized corresponding to the motion target value, the sense of incongruity which the driver feels will be reduced as compared with a case where a control is performed without taking into account the steering by a driver. In this regard, as explained in the column of embodiments described later, in a case of setting the total of the target value of the steering assist torque and the target value of the torque by the braking-driving force difference between the right and left wheels to be equal to the above-mentioned input torque value, the motion target value will be fully realized by the sum of the torque by the machine (i.e., the steering assist torque and the torque by the braking-driving force difference) and the steering torque by the driver. However, if it is tried to fully realize the motion target value determined based on the machine input, the driver's sense of incongruity could be increased. Thus, in the above-mentioned structure, the target value of the steering assist torque and the target value of the torque by the braking-driving force difference may be set smaller than and proportional to the input torque value.

In the above-mentioned inventive device, ratios in distributing the torque, given for the driving support control, into the steering assist torque and the torque by the right and left braking-driving force difference, and an assist amount given by the driving support control, namely, the magnitude of the torque given for the driving support control (the sum of the steering assist torque and the torque by the braking-driving force difference) may be appropriately adjusted. In one manner of these adjustments, for instance, the distribution ratios of the steering assist torque and the torque by the braking-driving force difference and the assist amount of the driving support control may be adjusted depending upon a driver's driving skill. For example, in a case of a driver having high-level driving skill, the assist amount of the driving support control may be low, and rather, in that case, it is anticipated that the sense of incongruity which the driver feels is reduced. Also, in a case of a driver having low-level driving skill, it is more effective to support his/her steering through the steering assist mechanism rather than through the torque vectoring mechanism (This is because, in the case of a driver having low-level driving skill, the steering operation of the driver becomes slow, and thus, there remains a larger room to be supported by the steering assist mechanism.). In this respect, as an index of a driver's driving skill, for instance, there may be employed a driver time constant or its function value. Then, the above-mentioned inventive device may comprise a driving support control amount determiner which determines, based on a driver time constant or its function value determined based on a driver's steering operation, a magnitude of a torque given for the driving support control with the steering assist torque and the braking-driving force difference between the right and left wheels; and/or, a torque distribution ratio determiner which determines, based on a driver time constant or its function value determined based on a driver's steering operation, each of distribution ratios of the steering assist torque and the torque given by the braking-driving force difference between the right and left wheels in the torque given for the driving support control, and thereby, the distribution ratios of the steering assist torque and the torque by the braking-driving force difference and the assist amount given by the driving support control may be adjusted based on a driver time constant or its function value.

With respect to the driver time constant or its function value, there may be individual differences, depending upon drivers, and also there may be intraindividual differences. Thus, the above-mentioned inventive device may comprise a driver time constant detector which detects the driver time constant or its function value based on the steering operation of the driver during the running of the vehicle. As illustrated in the column of Embodiments, this detector can be realized, for example, by a structure which employs an ideal model which realizes the above-mentioned motion target value through a steering operation, and determines the driver time constant or its function value based upon a difference of an actual steering amount (a steering torque, a steering angle, a steering angular velocity, a steering angular acceleration, etc.) of the driver from a steering amount of the ideal model. According to this structure, the acquisition of the driver time constant or its function value can be attained almost in real time, and in a case of a driver whose data of a driver time constant or its function value is absent or in a case that the driver time constant or its function value is changed during the driving, it becomes possible to regulate the distribution ratios of the steering assist torque and the torque by the braking-driving force difference and the assist amount given by the driving support control based on a proper driver time constant or its function value.

Effect of Invention

Thus, according to the above-mentioned present invention, briefly, during the execution of the driving support control, the coordination between an operation by a machine input and an operation by a driver input can be achieved. Namely, in the case of the inventive device, the driving operations of a vehicle are not alternatively determined by either of the operation only based on a machine input or by the operation only based on a driver input, but the operation based on the machine input and the operation based on the driver input coexist while being coordinated with one another. And, as noted above, in the inventive device, target values of a steering assist torque and a braking-driving force difference, given for the driving support, are not determined only by a machine input, but determined while taking into account the steering torque by a driver while not only the steering assist mechanism but also the torque vectoring mechanism of right and left wheels are used for the driving support control, and thereby, in the driving support control, the driver's intention is reflected through his/her steering so that the reduction of the sense of incongruity which the driver feels and the improvement of the driving comfortableness will be expected.

Other purposes and advantages of the present inventions will become clear by explanations of the following preferable embodiments of the present invention.

BRIEF DESCRIPTIONS OF DRAWINGS

FIG. 5A shows results of various support ratios w in fixing the share ratio S* at 0.5, and FIG. 5B shows results of various share ratio S* in fixing the support ratio w at 0.5. The arrows in the drawings indicate more preferable directions of the respective driver time constants in the setting of the share ratio S* or support ratio w.

EXPLANATIONS OF REFERENCE NUMERALS

10—Vehicle
12FL, FR, RL, RR—Wheels
14—Differential gear mechanism (or right and left driving force distributing differential gear)
20—Steering device
22—Handle
24—Steering booster device
26R, L—Tie rod
30—Yaw rate, lateral acceleration sensor
40—In-vehicle camera
42—In-vehicle radar device
44—GPS device
50—Electronic control device

DESCRIPTIONS OF EMBODIMENTS

The Structure of a Vehicle

Figure 1:
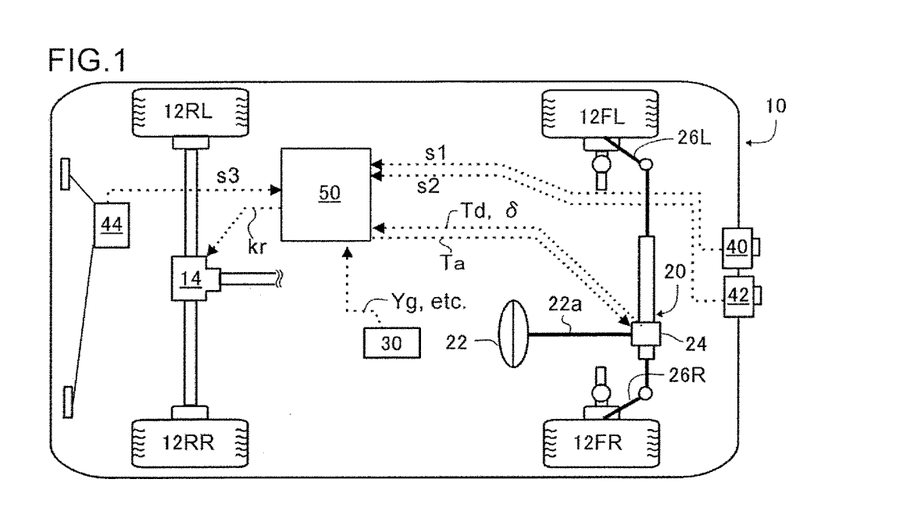
FIG. 1 is a schematic drawing of a vehicle installed with a preferable embodiment of a vehicle driving support control device according to the present invention is applied.

Referring to FIG. 1, a vehicle 10, such as a car, into which a preferable embodiment of the inventive driving support control device is installed, is equipped with right and left front wheels 12FL, 12FR; right and left rear wheels 12RL, 12RR; a driving device which generates braking-driving forces on the respective wheels (only rear wheels in a rear-wheel-drive vehicle as illustrated.) in response to the depressing of an accelerator pedal by a driver (only partially illustrated); a steering device 20 for controlling the steering angle of front wheels (further, a steering device may be equipped for the rear wheels.); and a braking device which generates a braking force in each wheel (not shown) in a usual manner. The driving device is designed such that a driving torque or a rotational force is transmitted from an engine and/or an electric motor (not shown) through a transmission (not shown) and the differential gear mechanism 14 to the rear wheels 12RL and 12RR in a usual manner. In this regard, the driving device may be a hybrid type driving device having both engine and electric motor. For the differential gear mechanism 14, in a case of performing a torque vectoring control by regulation of the distribution of the driving forces transmitted to the right and left wheels, a right and left driving force distributing differential gear which can perform the torque vectoring control may be employed. In this regard, in the differential gear mechanism 14, the regulation of the distribution of the braking-driving forces of the right and left wheels may be performed through adjusting the distribution of the braking forces of the right and left wheels. Furthermore, the driving device may be a driving device of type of in-wheel motor, and in that case, the regulation of the braking-driving forces are performed separately in the respective wheels.

For the steering device 20, there may be employed a power steering device which transmits rotation of a steering wheel (handle) 22 operated by a driver to tie rods 26L and R, while boosting its rotational torque with a booster device 24, to steer the front wheels 12FL and 12FR. Especially, in the present invention, as explained later, the torque added by the booster device 24 (the steering assist torque) is adjusted with reference to a target value of a motion of the vehicle, determined with circumferential information of the vehicle, etc., and a steering torque given by the driver through the handle. Thus, preferably, there may be provided a device, such as an arbitrary sensor, which detects or estimates a torque given to the handle by the driver. In this regard, in the structure of this embodiment, in order for the driver to perceive through the handle a condition of occurrence of a torque (self-aligning torque, etc.) in the yaw direction in the steered wheels (the right and left front wheels in the illustrated example), a mechanism in which the handle and steered wheels are mechanically directly linked to one another is employed.

Moreover, in the vehicle 10 to which a preferable embodiment of the inventive driving support control device is applied, there may be provided an in-vehicle camera 40, a radar device 42, etc. for detecting a circumferential situation of the vehicle, for example, road white lines (or yellow lines), other vehicles, obstacles, etc. around the own vehicle; and a GPS device 44 which communicates with a GPS satellite and acquires diverse information, including the information on the position of the own vehicle, etc. (car-navigation system).

Operational controls of the respective portions of the vehicle and operational controls of the driving support control device according to the present invention are executed by an electronic control device 50. The electronic control device 50 may comprise a microcomputer and drive circuits which have a CPU, a ROM, a RAM and input/output port apparatus mutually connected by bidirectional common bus in a usual way. Into the electronic control device 50, there are inputted a driver's steering torque Td, a steering angle δ, a yaw rate γ and/or a lateral acceleration Yg from a gyro sensor 30, information s1-s3 from the in-vehicle camera 40, the radar device 42, the GPS device 44, etc., and in manners mentioned later, control demands indicating a steering assist torque Ta, a control amount for a torque vectoring control (e.g., driving force distribution ratio kr), etc. are outputted from the electronic control device 50 to the corresponding devices. In this regard, although not illustrated, various parameters necessary for various controls to be performed in the vehicle of this embodiment, such as various detected signals, e.g., a longitudinal G sensor value, wheel speeds, etc. may be inputted and various kinds of control demands may be outputted to the corresponding devices from the electronic control device 50.

Structure of Driving Support Control System

In the driving support control technique in accordance with the present invention, briefly, as the way of supporting a driver's steering, first, in order to control the moving direction of a vehicle, there are employed not only a steering torque assist control performed with the steering device 20 for adjusting the steering angle of the steered wheel but also a braking-driving force distributing control to the right and left wheels performed with the torque vectoring mechanism (the right and left driving force distributing differential gear 14 in the example of FIG. 1). According to this structure, the torque vectoring control is made to bear a part of a control amount to be provided in the whole driving support control so that the control amount for the steering assist torque will be reduced, and thus, the difference between the steering torque which a driver tries to give through a handle and the torque which the driver perceives from the handle will be decreased so that the sense of incongruity of the driver will be relieved. Furthermore, the control amount given for the driving support is determined while taking into account the steering torque given to the handle by the driver, and thereby, the driver's intention is reflected in the driving of the vehicle even during executing the driving support control so that further relieving the sense of incongruity of the driver will be expected.

Figure 2A:
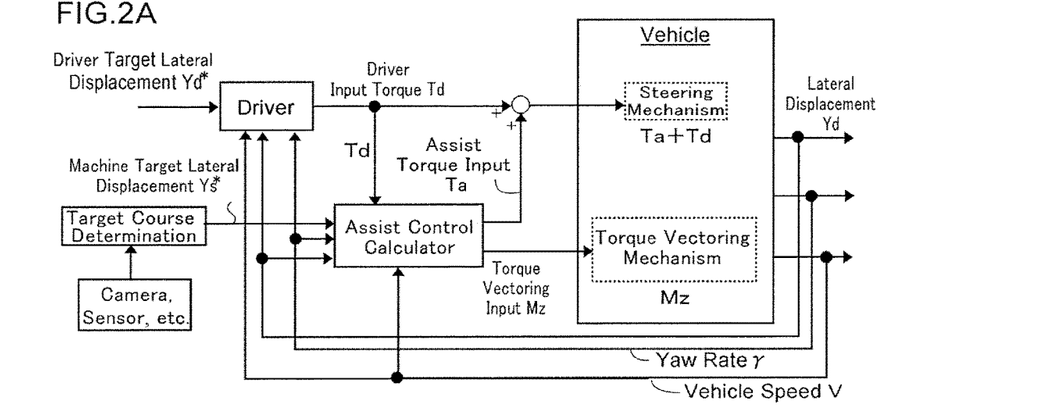
FIG. 2A shows the structure of a system in accordance with one embodiment of the inventive vehicle driving support control device in the form of block diagram.

Concretely, with reference to FIG. 2A, in the structure of a system including a driver in an embodiment of the driving support control technique according to the present invention, the driving of a vehicle is achieved by operations of a steering mechanism and a torque vectoring mechanism in accordance with the steering following the driver's intention and a control amount determined by the driving support control in an assist control calculator.

In this system, more in detail, first, the driver gives the steering mechanism of the vehicle a steering torque Td (driver input torque) which steers the handle, while taking into account the present conditions of the vehicle, such as a lateral displacement Yd, a yaw rate γ, a vehicle speed V, etc. of the vehicle, in order to achieve a driver target displacement Yd* determined according to the driver's intention. In this regard, it should be understood that an actual driver does not concretely determine a numerical value of the driver target displacement Yd*, but determines a position to be arrived at by visual observation during the driving and conducts a steering operation to the position in accordance with his/her own sense, and also that, similarly, an actual driver takes it into account the present conditions of the vehicle not by referring to those numerical values but by visual observation or his/her own physical senses.

On the other hand, into the assist control calculator, there are inputted a target lateral displacement (a machine target lateral displacement) Ys* from a target track determining portion, index values indicating the present conditions of the vehicle, such as the lateral displacement Yd, the yaw rate γ of the vehicle, etc., and further, a steering torque Td (driver input torque) at which the driver steers the handle. The machine target lateral displacement Ys* is a value acquired from a target track determined in the target track determining portion so as to realize the driving of the vehicle more optimally (for example, it may be a suitable running route (future course) set for the destination which the driver wishes.), by an arbitrary way, using vehicle circumferential information, for example, information on the position of a road white line, the presence or absence and the position of a preceding vehicle or an obstacle, the extending direction of a road, etc., obtained from the camera, etc. and information on a road line shape, such as a route or a course, etc., acquired from the GPS device, etc. That is, the machine target lateral displacement Ys* is a target value of a motion of the vehicle in the control based on a machine input determined without depending upon driver's driving operations. As explained later, from this machine target lateral displacement Ys*, further, there will be computed a target lateral acceleration $a_y^*$ for computing control amounts in the steering torque assist control and the braking-driving force distributing control of right and left wheels performed as the driving support control. Moreover, the lateral displacement Yd of the vehicle may be a lateral displacement of the vehicle from a reference point set arbitrarily, and the present position of the vehicle may also be set as the reference point (In that case, the lateral displacement Yd=0 is always established.). And, in a manner described later, based on the above-mentioned input information, the assist control calculator computes out a steering assist torque input Ta to be given in addition to the driver input torque Td and a torque vectoring amount (yaw moment) Mz corresponding to the right and left braking-driving force difference to be generated by the torque vectoring mechanism, and sends those computed values as control demands to the steering mechanism and torque vectoring mechanism of the vehicle, respectively.

Computation Principle of Steering Assist Torque Input Ta and Torque Vectoring Amount Mz In the driving support, taking into account a driver's steering torque Td, a steering assist torque input Ta and a torque vectoring amount Mz, given to the steering mechanism and the torque vectoring mechanism of the vehicle, respectively, may be given by the following expressions, respectively:

$$Ta = wS^*[(\xi ml_r/nL)a_y^* - Td] \quad (1a)$$

$$Mz = w(1-S^*)(nL/\xi)[(\xi ml_r/nL)a_y^* - Td] \quad (1b)$$

where, $a_y^*$ is a target lateral acceleration; w is a support ratio by this control, and S* is a ratio of an amount attained by the steering assist torque input Ta in the total assist amount given by this control (referred to as a "share ratio", hereafter.). Further, ξ, m, $l_r$, n, and L are a pneumatic trail, a vehicle weight, a distance between the centroid of the vehicle and the rear wheel axis, a steering gear ratio, and a wheel base, respectively, and these are constant coefficients in this control. In the above, the target lateral acceleration $a_y^*$ is the lateral acceleration for attaining the machine target lateral displacement Ys* as already noted, which is one example of motion target values, i.e., target values of motion index values representing vehicle motions in the driving support control, determined without depending upon driver's driving operations. In this regard, the target lateral acceleration $a_y^*$ is derived in an ideal driver/vehicle model portion as described above.

The support ratio w is, more in detail, the ratio of all control amounts, actually given to the steering assist mechanism and/or torque vectoring mechanism, to all control amounts to be given to the steering assist mechanism and/or torque vectoring mechanism in the case of fully achieving the target lateral acceleration $a_y^*$ according to the steering of the driver and the support through the steering assist mechanism and/or torque vectoring mechanism. Namely, at the support ratio w=1, the driving support by the steering assist mechanism and/or torque vectoring mechanism will be performed so that the target lateral acceleration $a_y^*$ will be fully achieved while, at the support ratio w=0, no driving support will be performed. Moreover, S* and (1−S*) each indicate the distribution ratios of the control amounts requested to the steering assist mechanism and the torque vectoring mechanism, respectively, in the whole control amounts for the driving support. That is, at the share ratio S*=1, the driving support will be performed only by operating the steering assist mechanism while at the share ratio $S^*=0$, the driving support will be performed only by operating the torque vectoring mechanism.

The above-mentioned expressions (1a) and (1b) are derived as follows: First, considering only a steady characteristic in the two-wheel model of a vehicle, the equations of motion are given by:

$$ma_y^* = 2(Yf + Yr) \quad (2a)$$

$$2l_fYf - 2l_rYr + Mz = 0 \quad (2b)$$

where Yf, Yr, and $l_f$ are a front wheel cornering force, a rear wheel cornering force, and the distance between the centroid of the vehicle and the front wheel axis, respectively. On the other hand, ignoring actions of complicated suspension mechanisms, a self-aligning torque of tires is represented by:

$$T_{SAT} = -2\xi i Yf/n \quad (3)$$

Furthermore, using the steering assist torque Ta, driver input torque Td and self-aligning torque $T_{SAT}$, the balance of torques around a steering wheel (handle) can be expressed by:

$$Td + Ta + T_{SAT} = 0 \quad (4)$$

and thus, by substituting expressions (2a), (2b), and (3) into expression (4), the following relation is obtained:

$$Ta + (\xi/nL)Mz = (\xi ml_r/nL)a_y^* - Td \quad (5).$$

In the above-mentioned expression (5), the first term of the right-hand side is a torque which gives the target lateral acceleration $a_y^*$ for achieving the machine target lateral displacement Ys*, and therefore, the whole right-hand side represents a value obtained by deducting the steering torque given by the driver (driver input torque) from the torque which gives the target lateral acceleration $a_y^*$. On the other hand, the left side of expression (5) is the total sum of the steering assist torque Ta given through the steering mechanism and the torque obtained by converting the torque vectoring amount (yaw moment) Mz given by the braking-driving force difference between the right and left wheels through the torque vectoring control. Namely, both sides of expression (5) each represent the magnitude of a torque given by a machine necessary for fully achieving the target lateral acceleration $a_y^*$ (added to a driver's steering torque), indicating that the target lateral acceleration $a_y^*$ would be fully achieved by providing the torque of the right-hand side of expression (5) by total of the steering assist torque Ta and the torque generated by the torque vectoring amount Mz as the driving support by a machine.

Thus, the total of the torques given as the above-mentioned driving support will be realized while being distributed to the steering assist torque Ta and the torque vectoring amount Mz. Then, as noted, since the distribution ratios of the steering assist torque Ta and an assist torque converted from the torque vectoring amount Mz in the total of the torques for the driving support can be set as:

$$S^*:(1-S^*) = Ta:(\xi/nL)Mz \quad (6),$$

the steering assist torque Ta and the torque vectoring amount Mz in the case of fully achieving the target lateral acceleration ay* each are given by:

$$Ta = S^*[(\xi ml_r/nL)a_y^* - Td] \quad (7a)$$

$$Mz = (1-S^*)(nL/\xi)[(\xi ml_r/nL)a_y^* - Td] \quad (7b).$$

However, when fully achieving the target lateral acceleration ay*, it is possible for the driver to feel the sense of incongruity that his/her intention is hardly reflected. Then, as already noted, in order to reduce the steering assist torque Ta and the torque vectoring amount Mz, actually given, the support ratio w (=0-1) is multiplied to the right-hand sides of expressions (7a) and (7b), and thereby, the above-mentioned expressions (1a) and (1b) are obtained.

Determination of Share Ratio S* and Support Ratio w

The share ratio S* (the distribution ratio of the steering assist torque) and the support ratio w in the above-mentioned expressions (1a), (1b) may be determined arbitrarily experimentally or experientially. In this respect, the necessity for the driving support control in the purpose of achieving the driving of a vehicle efficiently and the degree of the sense of incongruity that the driver feels against the driving support control vary depending upon a steering characteristic, individual driving skill, body conditions, experiences of the driver in roads on which the vehicle is running (the driving skill of a driver changes depending on whether or not he/she is familiar to the road on which the vehicle is running.). Then, in this embodiment, the share ratio S* and support ratio w may be determined according to a driver's steering characteristic. In this respect, for a driver's steering characteristic, there may be employed a driver time constant, which is an index value representing a response speed of a driver in the case of modeling characteristics in responses of a driver and a vehicle to inputs thereto. That is, in one manner of the present invention, the share ratio S* and support ratio w may be determined with reference to a driver time constant.

For a preferable example of the setting of the share ratio S* and support ratio w, concretely, when a driver time constant is small, namely, in a case of a driver who is quickly responsive and highly skilled in driving a vehicle, the degree of the whole support in the driving support control may be low, and since it is expected that the driving of the vehicle by steering will be performed comparatively exactly, it is considered to be better that the support ratio w is set small, and the share ratio S* is set also small, rendering the ratio of the support through torque vectoring to be higher. On the other hand, when a driver time constant is large, namely, in a case of a driver who is slowly responsive and less skilled in driving, the high degree of the whole support of the driving support control is preferable, and because it is anticipated that the room to be supported in the driving of a vehicle through the steering is large, it is considered to be better that the support ratio w is set large, and the share ratio S* is set also large, rendering the ratio of the steering assist torque to be higher.

As explained below, that the setting as described above is one preferable example is shown also by a theoretical analysis using a numerical model about the influences of the driver time constant, share ratio S* and support ratio w to the response of a vehicle motion in a system of FIG. 2A (a response system of a vehicle also including the driver's response).

Concretely, referring to FIG. 2A again, first, in a numerical model of a response system of a vehicle motion also including a driver's response, with respect to a steering torque in which a driver's response is taken into account, it is assumed in accordance with the front gaze model that the driver inputs a torque in proportion to the difference between a front gaze target lateral displacement Yd* and a front gaze lateral displacement Yd. In that case, using the driver time constant Tn, the steering torque Td which the driver inputs (driver input torque) is given by:

$$Td = H\{\{(1-td\cdot s)/(Tn\cdot s+1)\}Yd^* - (Yd + TpV\Psi)\} \quad (8),$$

where H, td, Tp, V, and Ψ are a driver's torque gain (constant), a dead time (constant), a driver's front gaze duration (constant), a vehicle speed and a vehicle yaw angle, respectively. In this regard, s is a frequency variable after Laplace transform. Further, in the steering mechanism, ignoring the suspension mechanism for simplicity, the steering angle δ is assumed to be generated in primary delay with respect to the input torque (the sum of the driver input torque Td and the steering assist torque Ta). In that case, using a steering gain Kfw (constant) and a steering time constant Tfw (constant), the steering angle δ is given by:

$$\delta = \{Kfw/(1+Tfw \cdot s)\}(Td+Ta) \qquad (9).$$

Furthermore, the lateral displacement Yd and yaw angle Ψ of the vehicle are generated by the input of the steering angle δ and the yaw moment input Mz by the torque vectoring, and thus given as:

$$Yd = (VG_\delta/s^2)\delta + (VG_M/s^2)Mz \qquad (10a)$$

$$\Psi = (s/V)Yd \qquad (10b),$$

where $G_\delta$ and $G_M$ are a steering angle gain (constant) and a torque vectoring gain (constant), respectively.

On the other hand, the steering assist torque Ta and the yaw moment Mz by the torque vectoring are given by expressions (1a) and (1b) as noted. The target lateral acceleration $a_y^*$ in these expressions may be given in various ways. Especially, in this embodiment, assuming that the machine target lateral displacement Ys* is equal to front gaze target lateral displacement Yd* (Yd*=Ys*), and the vehicle lateral displacement Yd is equal to the front gaze lateral displacement Yd, the target lateral acceleration $a_y^*$ is assumed to be obtained by multiplying a gain, given by $4V^2/(Ts \cdot V)^2$, to the difference between the front gaze target lateral displacement Yd* and front gaze lateral displacement Yd. Then, the target lateral acceleration $a_y^*$ is given by:

$$a_y^* = \{4V^2/(Ts \cdot v)^2\} \cdot \{Yd^* - (Yd+TpV\Psi)\} \qquad (11)$$

Figure 5A:
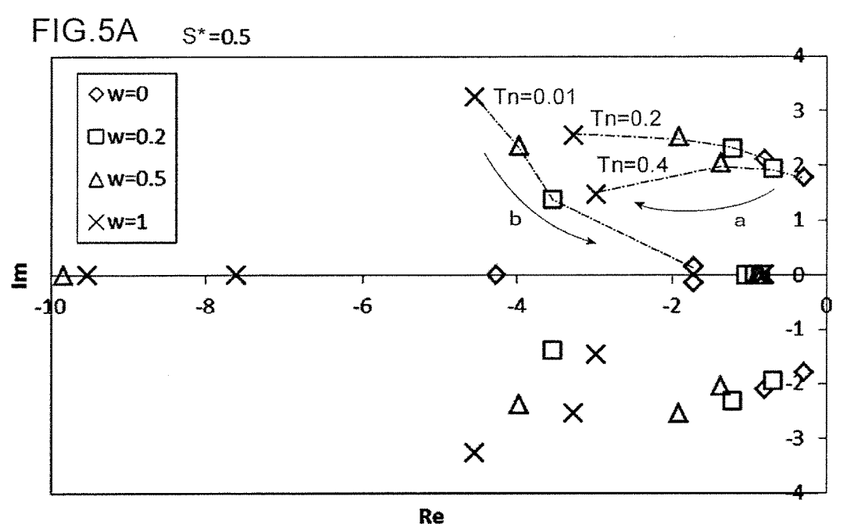
FIGS. 5A and 5B show the root loci in changing a driver time constant for a characteristic equation of a transfer function from a target lateral displacement to a vehicle lateral displacement.
Figure 5B:
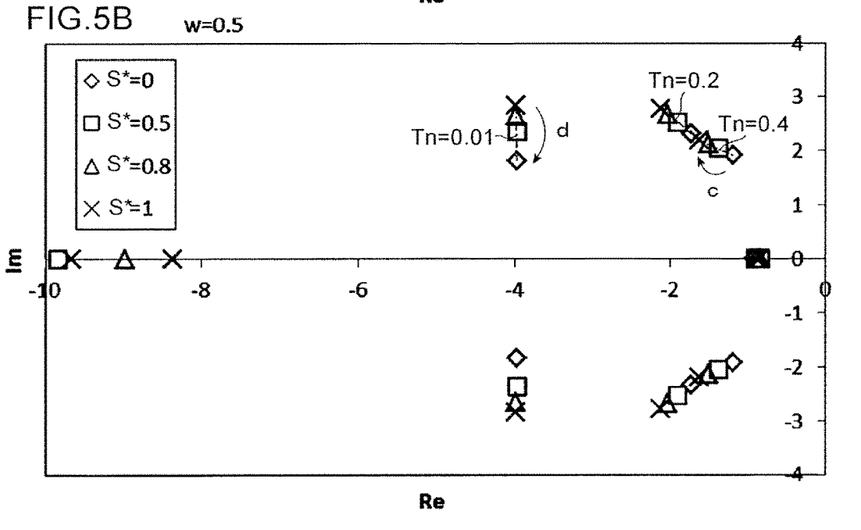

Thus, in the system constructed by the above-mentioned expressions (1a), (1b) and (8)-(11), the influences of the driver time constant Tn, share ratio S*, and support ratio w to the stability and convergence of the system have been checked by a root locus analysis with respect to the transfer function Yd/Yd* outputting the vehicle lateral displacement Yd from the target lateral displacement Yd* under conditions that various values are set for the share ratio S* and support ratio w, respectively. Then, there have been obtained the root loci of the transfer function Yd/Yd* with respect to the driver time constant Tn of the system as shown in FIGS. 5A and 5B. In this regard, the characteristic equation of the transfer function Yd/Yd* is a 4th equation of s, where two real number roots and two complex number roots exist as characteristic roots. In the root loci, i.e., plots of complex number root, generally, as the plot position moves to the left-hand side (largely in the negative side) in the lateral direction (the real number axis Re direction), the stable point of an output value becomes deep, and accordingly, the stability of the system is judged to be better. On the other hand, as the plot position moves closer to the lateral axis (the real number axis) in the ordinate axis direction (the imaginary number axis Im direction), the vibrational frequency of an output value becomes low so that the convergence of a system is judged to be better.

Then, with reference to FIG. 5A, first, when the support ratio w is changed between 0-1 under the condition of the share ratio S*=0.5, the following tendencies are understood from the root loci of the driver time constant Tn between 0.01-0.4: In a case that the driver time constant Tn is large (Tn=0.4) (namely, a response is slow), when the support ratio w is large, as indicated by the "arrow a", the stability of the system become better (In the graph of the root loci, the plot positions are shifted to the left-hand side, namely, more largely to the negative side) and also, the convergence of the system become better (In the graph of the root loci, the plot positions become closer to the lateral axis), as compared with when the support ratio w is small. On the other hand, in a case that the driver time constant Tn is small (Tn=0.01) (namely, a response is quick), when the support ratio w is large, as indicated by the "arrow b", the convergence of the system becomes worse (In the graph of root loci, the distance of the plot from the lateral axis becomes large.) as compared with when the support ratio w is small. These results suggest: when a driver's response is slow, the driver's ability to lead a vehicle to a target position is low and therefore it is preferable to make the support ratio w large, thereby guiding the system stably as certainly as possible; on the other hand, when a driver's response is quick, the driver's ability to lead a vehicle to a target position is high, and in that case, if the degree of the support is too high, the response of the vehicle may become too quick and rather liable to be vibrational, and thus, the necessity of making the support ratio w large is low.

On the other hand, referring to FIG. 5B, when the share ratio S* is changed between 0-1 under the condition of support ratio w=0.5, the following tendencies are understood from the root loci of the driver time constant Tn between 0.01-0.4: In a case that the driver time constant Tn is large (Tn=0.4) (namely, a response is slow), when the share ratio S* is large, as indicated by the "arrow c", the stability of the system becomes high as compared with when the share ratio S* is small (there are no large differences in the convergence). On the other hand, in a case that the driver time constant Tn is small (Tn=0.01) (namely, a response is quick), when the share ratio S* is small, as indicated by the "arrow d", the convergence of the system becomes better, as compared with when the share ratio S* is large. These results suggest: when a driver's response is slow, since the steering is slow, it is preferable to make the share ratio S* large (increasing the steering assist torque), thereby guiding the system stably as certainly as possible; on the other hand, when a driver's response is quick, since the steering torque required for the lateral displacement is achieved promptly by the driver's steering, it is preferable that the operation by the machine input for the driving support is performed not by the steering assist mechanism but through the support by the torque vectoring, thereby improving the convergence of the system.

Figure 6:
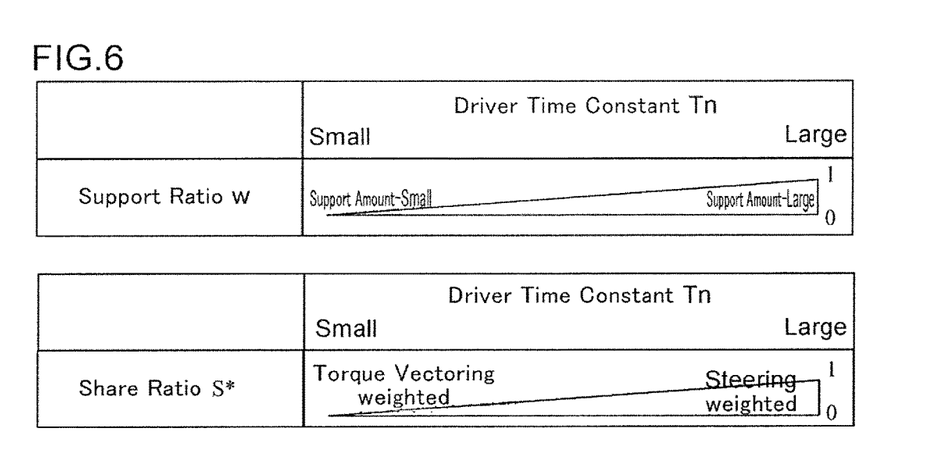
FIG. 6 shows a preferable example of the ways of setting share ratio S* and support ratio w for a driver constant.

In summary, in one preferable example of the setting of the share ratio S* and support ratio w, it is understood that, as the driver time constant Tn is larger, the support ratio w and share ratio S* may be set larger as illustrated in FIG. 6. It should be noted that, since the share ratio S* and support ratio w will be set based on a driver's operation characteristic, it is expected to make it possible to realize the operation by a machine input at higher cooperativeness to the operation by a driver input.

Structure and Operation of Assist Control Calculator

Thus, in the assist control calculator, the steering assist torque Ta and the torque vectoring amount Mz, described in the expressions (1a), (1b) as explained above, are computed out with reference to the machine target lateral displacement Ys* given from the target course determining portion and the steering torque Td by the driver (driver input torque).

Figure 2B:
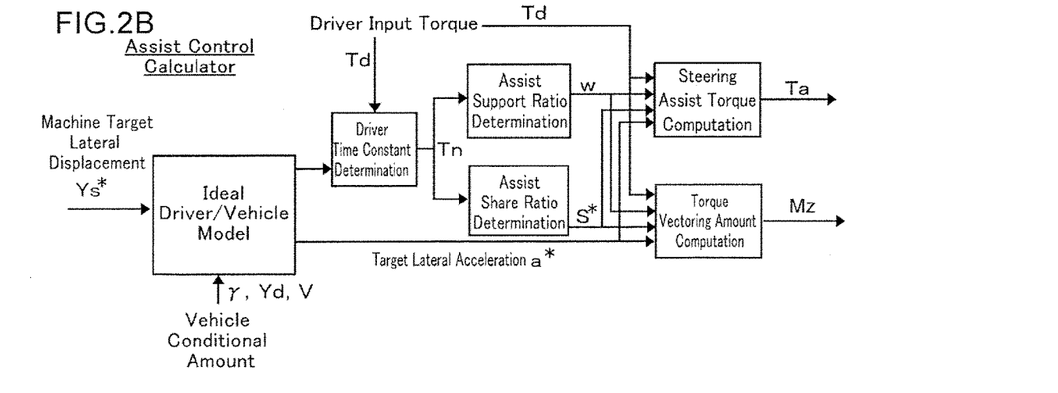
FIG. 2B shows the structure of an assist controller in the vehicle driving support control device of FIG. 2A in the form of block diagram.

Concretely, referring to FIG. 2B, in the assist control calculator, first, with reference to a machine target lateral displacement Ys* given from a target course determining portion and conditional amounts representing conditions of an actual vehicle, the ideal driver/vehicle model portion conducts computing a target lateral acceleration $a_y^*$ and a steering torque Td* (ideal steering torque) of an ideal driver, using an arbitrary model describing a response of the driver and a motion of the vehicle. For instance, the target lateral acceleration $a_y^*$ and the ideal driver's steering torque Td* may be computed with expression (10) and expression (8), used in the numeric model explained above, but, it should be understood that other numeric models may be employed. Then, the target lateral acceleration $a_y^*$ is given to a steering assist torque computing portion and a torque vectoring amount computing portion while the ideal steering torque Td* is given to a driver time constant determining portion. In this connection, the lateral displacement Yd and yaw angle $\Psi$ of the vehicle in expressions (8) and (10) may be values measured from a reference point and reference direction set arbitrarily. When the reference point and reference direction are set to the own vehicle, the values are set to 0.

Figure 3:
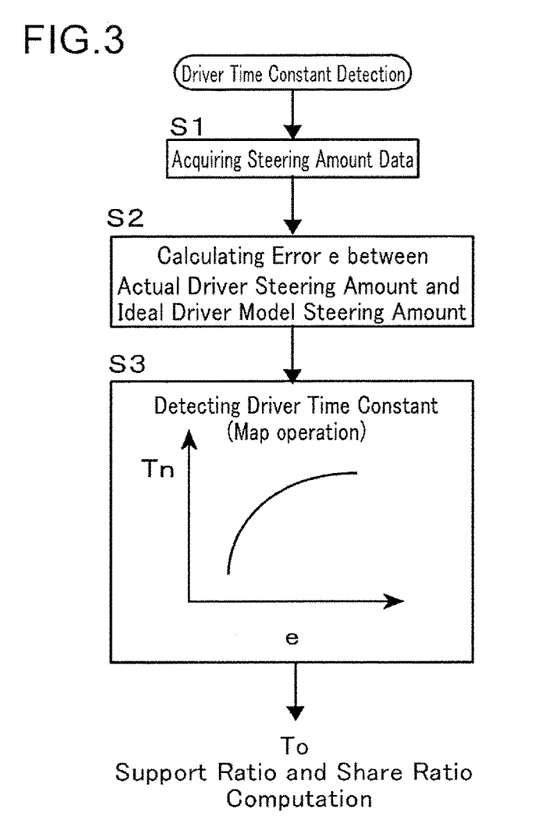
FIG. 3 shows processes for detecting a driver time constant in the form of flow chart.

The driver time constant determining portion computes out a driver time constant Tn typically by comparing an actual driver input torque Td and an ideal steering torque Td*. Concretely, referring to FIG. 3, first, a driver input torque Td (steering amount data) is acquired (step 1) and an error e between the driver input torque Td (real driver steering amount) and ideal steering torque Td* (ideal driver model steering amount) is computed (step 2). Then, using a map giving a value of the driver time constant Tn with the error e as a variable parameter, the driver time constant Tn is determined (step 3). In this regard, the map giving the driver time constant Tn can be prepared experimentally or theoretically beforehand. Further, the steering amount data referred to as a variable parameter in the determination of the driver time constant Tn may be other values related to the steering of a driver, representing the response characteristic of a driver's steering (namely, related to the driver time constant Tn), such as a steering angle, a steering angular velocity, a steering angular acceleration.

Figure 4A:
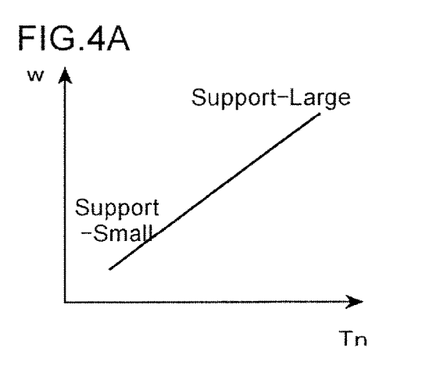
FIG. 4A shows an assist support ratio w set in accordance with a driver time constant in the graph form.
Figure 4B:
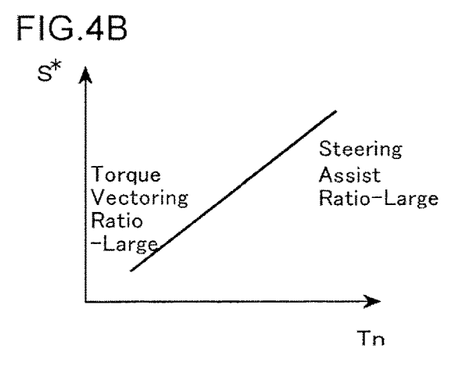
FIG. 4B shows an assist share ratio S* set in accordance with a driver time constant in the graph form.

The driver time constant Tn determined as noted above is sent to an assist support ratio determining portion and an assist share ratio determining portion, where, using previously prepared maps giving values of the support ratio w and share ratio S* with the driver time constant Tn as a variable parameter, as illustrated in FIG. 4A and FIG. 4B, the support ratio w and share ratio S* are determined, respectively, and these ratio are given to a steering assist torque computing portion and a torque vectoring amount computing portion. The maps giving values of the support ratio w and share ratio S* may be prepared beforehand in accordance with the knowledge explained in the section of "Determination of Share Ratio S* and Support Ratio w" in conjunction with FIGS. 5 and 6. Then, the steering assist torque computing portion and torque vectoring amount computing portion each compute out a steering assist torque Ta and a torque vectoring amount Mz with expressions (1a), (1b), using the target lateral acceleration $a_y^*$, support ratio w and share ratio S*, and these values are given to the steering assist mechanism and the torque vectoring mechanism as their control demands, thereby generating a steering assist torque and a yaw moment for the driving support.

In the above-mentioned assist control calculator, it should be noted that the support ratio w and share ratio S* are determined by the driver time constant Tn determined in real time. According to this structure, it is advantageous in that the driving support can be provided at the support ratio w and share ratio S* which are suitable for the characteristic of the driver driving actually a vehicle during the execution of the driving support control. As already noted, while it is preferable to determine the support ratio w and share ratio S* with a driving characteristic, such as a driver's driving skill, the driving characteristic varies by individual differences and intraindividual differences (the driver's body conditions; whether or not the driver is familiar the presently running road, where or not the driver is good at the running at a road junction; variations of the driver's skill owing to circumferential changes in the weather and a road situation, etc.). So, by making it possible to determine in real time the driver time constant Tn, which is an index representing the driving characteristics, the support ratio w and share ratio S* more suitable for the driver during driving will be obtained, and thereby it is expected to execute the driving support control better. In this regard, in an embodiment, an arbitrary parameter corresponding to the driver time constant Tn (a function value of the driver time constant Tn) may be used as a parameter for determining the support ratio w and share ratio S*.

Therefore, in the embodiment of the above-mentioned inventive driving support control device, the driving support is performed based on the steering assist torque Ta and torque vectoring amount Mz which are functions of the driver input torque, and thereby, the driving support control is performed not only by a machine input but also while a driver's steering input being reflected, and accordingly, it is expected to reduce the driver's sense of incongruity to the steering and further improve the cooperativeness in operations between the driving support control and the driver's operation. Moreover, since the ratios and magnitudes of the steering assist torque Ta and the torque vectoring amount Mz are determined with the driver time constant Tn, i.e., the index value representing the driving characteristic of a driver, it is expected to make it possible to provide the driving support more highly suitable for the driver's steering characteristic.

Although the above explanation has been described with respect to embodiments of the present invention, it will be apparent for those skilled in the art that various modifications and changes are possible, and that the present invention is not limited to the above-illustrated embodiments and may be applied to various devices and apparatus without deviating from the concepts of the present invention.

The invention claimed is:

1. A driving support control device of a vehicle equipped with a steering assist mechanism and a torque vectoring mechanism of right and left wheels, comprising:
   a steering assist torque controller configured to control a steering assist torque for the driving support control, given by the steering assist mechanism;
   a right and left braking-driving force difference controller configured to control a braking-driving force difference between the right and left wheels for the driving support control, given by the torque vectoring mechanism;
   a motion target value determiner configured to determine a motion target value which is a target value of a motion index value representing a motion of the vehicle in the driving support control without depending upon a driving operation of the driver;
   a control target value determiner configured to determine, based on the motion target value and a steering torque by the driver, a target value of the steering assist torque and a target value of the braking-driving force difference for the driving support control,
   wherein the target value of the steering assist torque and the target value of the braking-driving force difference are determined based on an input torque value which is a torque amount obtained by deducting the steering torque by the driver from a torque corresponding to the motion target value, and a sum of the target value of the steering assist torque and the target value of the braking-driving force difference is proportional to and smaller than the input torque value.

2. The device of claim 1, further comprising a torque distribution ratio determiner which determines, based on a driver time constant or its function value determined based on a steering operation of the driver, respective ratios of a torque given by the steering assist torque and a torque given by the braking-driving force difference between the right and left wheels in a torque making the vehicle turning.

3. The device of claim 2, wherein, when the driver time constant is large, the ratio of the torque given by the steering assist torque to the torque given by the braking-driving force difference between the right and left wheels is larger than when the driver time constant is small.

4. The device of claim 2, further comprising a driver time constant detector which detects the driver time constant or its function value based on the steering operation of the driver during running of the vehicle.

5. The device of claim 1, further comprising a driving support control amount determiner which determines magnitudes of a torque given by the steering assist torque and a torque given by the braking-driving force difference between the right and left wheels for the driving support control based on a driver time constant or its function value determined based on a steering operation of the driver.

6. The device of claim 5, wherein, when the driver time constant is large, the magnitudes of the torque given by the steering assist torque and the torque given by the braking-driving force difference between the right and left wheels for the driving support control is larger than when the driver time constant is small.

* * * * *